United States Patent [19]
Cupo

[11] Patent Number: 5,841,814
[45] Date of Patent: Nov. 24, 1998

[54] SAMPLING SYSTEM FOR RADIO FREQUENCY RECEIVER

[75] Inventor: Robert L. Cupo, Eatontown, N.J.

[73] Assignee: Paradyne Corporation, Largo, Fla.

[21] Appl. No.: 544,244

[22] Filed: Oct. 17, 1995

[51] Int. Cl.[6] .............................. H04B 1/26; H03D 1/24; H04N 5/455; H04N 5/46
[52] U.S. Cl. ...................... 375/321; 375/324; 375/344; 329/304; 329/348; 329/357; 329/361; 348/726; 455/204; 455/207; 455/209; 455/214; 455/315; 455/323
[58] Field of Search .................................... 375/261, 264, 375/270, 277, 316, 320–322, 324, 328, 340, 344; 348/725, 726; 455/204, 205, 207–209, 214, 313–315, 323, 324; 329/304, 316, 323, 348, 357, 358, 359, 361

[56] References Cited

U.S. PATENT DOCUMENTS

| | | | |
|---|---|---|---|
| 5,142,553 | 8/1992 | Rosenkranz | 375/316 |
| 5,375,146 | 12/1994 | Chalmers | 375/344 |
| 5,506,636 | 4/1996 | Patel et al. | 348/725 |
| 5,557,642 | 9/1996 | Williams | 375/316 |
| 5,640,698 | 6/1997 | Shen et al. | 455/323 |
| 5,673,293 | 9/1997 | Scarpa et al. | 375/321 |

FOREIGN PATENT DOCUMENTS

| | | | |
|---|---|---|---|
| 0458452 A2 | 11/1991 | European Pat. Off. | H03D 1/22 |
| 0574273 A1 | 12/1993 | European Pat. Off. | H03D 3/00 |
| 0667712 A2 | 8/1995 | European Pat. Off. | H04N 5/44 |

OTHER PUBLICATIONS

Groshong, et al., "Undersampling Techniques Simplify Digital Radio," Electronic Design, vol. 39, No. 10, May 23, 1991, pp. 67–68, 70, 73–75, 78.

Grant, T.L., "A versatile microprocessor–controlled hybrid receiver," NTC 78, Conference Record of the IEEE 1978 National Telecommunications Conference, Birmingham, AL, vol. 1, Dec. 3–6, 1978, pp. 2.1/1–5.

*Primary Examiner*—Amanda Le
*Attorney, Agent, or Firm*—Thomas, Kayden, Horstemeyer & Risley, L.L.P.

[57] ABSTRACT

A radio frequency (rf) receiver adapted to receive a number of different digitally modulated rf input signals such as quadrature amplitude modulated (QAM) and vestigial side band (VSB) rf input signals includes circuitry for down converting the rf input signals to an intermediate frequency (IF) range having a center frequency fc2 and a bandwidth of Bhz and converter circuitry for sampling the IF signals and then producing corresponding baseband signals. In a preferred embodiment, the intermediate frequency signals are applied to a sample and hold circuit which is sampled at a frequency fs and whose output is coupled via a low pass filter to an analog-to-digital converter whose output is then applied to a Hilbert filter for demodulating the sampled signals and producing baseband signals. In-phase (I) and quadrature (Q) signals are produced whose phase and amplitude are not a function of different components and their tolerance of different conduction paths, as in the prior art.

28 Claims, 4 Drawing Sheets

SAMPLING SYSTEM FOR RADIO FREQUENCY RECEIVER

BACKGROUND OF THE INVENTION

This invention relates to an improved radio frequency (rf) receiver system and, in particular, to a receiver system in which sampling of the received signal is performed in the intermediate frequency (IF) band.

To better understand the problems solved by the invention reference is made to FIG. 1 which shows a portion of a prior art conventional TV receiver with baseband sampling for vestigial side band (VSB) or quadrature amplitude modulation (QAM) mode of operation. This receiver employs a synchronous detector and an analog pilot tone recovery loop shown in block 20 of FIG. 1. For a VSB signal, only one channel (i.e., the I channel, including mixer 21, filter 28 and ADC 29) is needed, requiring only one analog-to-digital (i.e., ADC 29) converter. However, a substantial amount of circuitry is required for implementing the synchronous detector, as is evident from an examination of block 20 shown in FIG. 1.

In FIG. 1, received rf input signals 9 are propagated via a first band pass filter (BPF 10), an amplifier (AMP 11), a first mixer (MX1) which mixes the output of AMP 11 with the output of a first local oscillator (LO1), a second band pass filter (BPF 14), a second mixer (MX2) which mixes the output of BPF 14 with the output of a second local oscillator (LO2), a third band pass filter (BPF 17) and an IF amplifier 18 to produce an IF signal, e1, present at the output of amplifier 18. In FIG. 1, the IF output will have a bandwidth of 6 MHz, centered around 44 MHz. The IF signal e1 is supplied to one input of a mixer 21 having another input to which is applied an output of a third local oscillator (LO3). The output of mixer 21 which is defined as the in-phase (I) signal is applied to the input of an anti-aliasing low pass filter (AALPF) 28. The output of AALPF 28 is then applied to an N-bit analog-to-digital converter (ADC) 29. The output of ADC 29 is applied to an input port of a baseband demodulator chip 32. In addition, a pilot low pass filter (Pilot LPF) 24, has an input connected to the I output of mixer 21, and an output connected to an input of a limiter 25 having an output connected to an input of a mixer 26.

When quadrature amplitude modulation (QAM) mode is present and needs to be decoded, another problem arises. Since QAM has an in-phase (I) input and a quadrature (Q) baseband input, a second analog channel and a second A/D converter are required to decode the input data. This is shown in FIG. 1, where the signal e1 is applied to one input of a mixer 22 having another input connected to an output of the LO3 for producing the quadrature (Q) output signal. The Q signal is applied to an input of an anti-aliasing low pass filter (AALPF) 31 whose output is applied to an input port of an N-bit analog-to-digital converter, 30. ADC 29 and 30 function to sample the signal in the baseband frequency range. The baseband $I_B$ output of ADC 29 and the baseband $Q_B$ output of ADC 30 are then applied to the inputs of a timing recovery circuit 34 and to the inputs of an AGC circuit 36 located within demodulator 32.

The analog pilot loop includes mixing the Q output from mixer 22 and the I output derived from limiter 25 in a mixer 26 whose output is applied to the input of a pilot low pass filter (LPF 27). The output of pilot LPF 27 is an analog signal which is applied to, and controls, the second local oscillator circuit, (LO2). Analysis of the prior art circuit indicates the existence of several problems.

First, there is a problem related to the complexity of the synchronous detector components required to produce the I and Q functions.

Secondly, there exists a distinct possibility that the two analog channels (mixer 21 and AALPF 28; mixer 22 and AALPF 31) will have different responses to the amplitude and phase of the signals being propagated due to component tolerances of the mixers and filters. This will have a negative impact on the quality of performance. A solution to this problem was suggested in an article entitled Asymmetric Baseband Equalization by Hikmet Sari and Georges Karam (IEEE Transactions on Communications, Vol. 36, No. 9, September, 1988). However, this reference suggests the use of an asymmetric structure which requires twice as many taps as a conventional symmetric equalizer as well as twice the adaptation control.

Note that the prior art, as shown in FIG. 1, teaches the sampling of the baseband stage (i.e., the outputs of AALPF 28 and 31). Sampling at the baseband level suffers because of:

a—quadrature imperfections on the modulator carriers;

b—amplitude imbalance between the I and Q baseband analog channels; and c—phase imbalance between the I and Q baseband analog channels.

Accordingly, it is an object of this invention to solve the problem with a system which is simpler in that it uses fewer components, and which avoids the problem of producing and propagating the I and Q signals along two different paths which introduce different phase and amplitude factors into the signal.

SUMMARY OF THE INVENTION

Systems embodying the invention include means for controlling the tuner and IF stages of the front end of a high definition television (HDTV) receiver to enable the receiver to handle both vestigial side band (VSB) and quadrature amplitude modulated (QAM) schemes of digital modulation.

In systems embodying the invention the output of an IF stage is sampled as compared to the sampling of the baseband stage, as is typically done in the prior art.

Systems embodying the invention eliminate the need for much of the synchronous detector circuitry found in the prior art. This eliminates the cost of rather expensive circuitry. Also and perhaps more important is that both the VSB and QAM signals pass through and along the same analog channel. This eliminates the presence of two different paths which introduce different delays and different gain factors to incoming signals.

BRIEF DESCRIPTION OF THE DRAWINGS

In the accompanying drawing like reference characters denote like components.

DETAILED DESCRIPTION OF THE INVENTION

Figure 1:
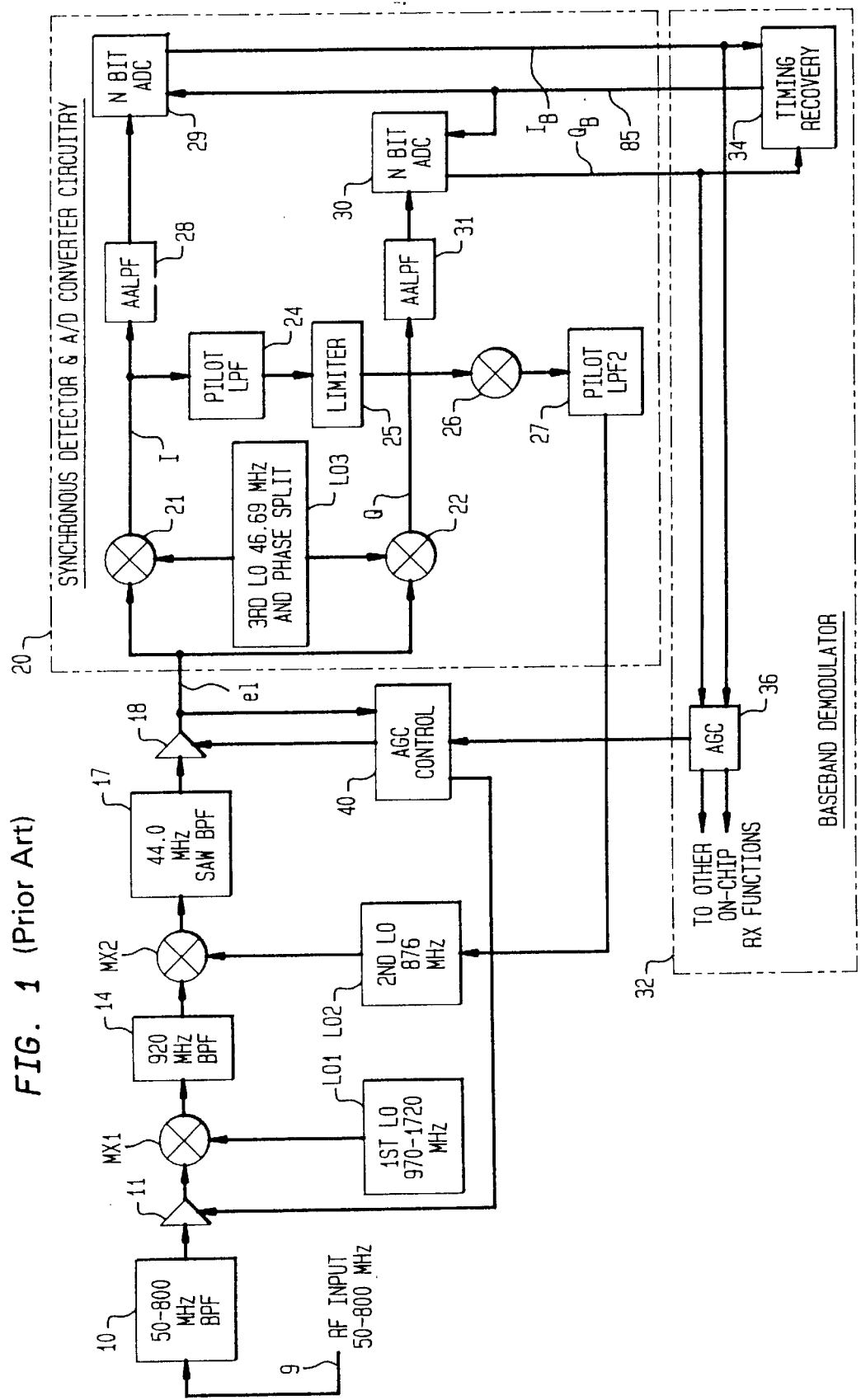
FIG. 1 is a block diagram of a high definition TV (HDTV) receiver with baseband sampling in accordance with the prior art.
Figure 2:
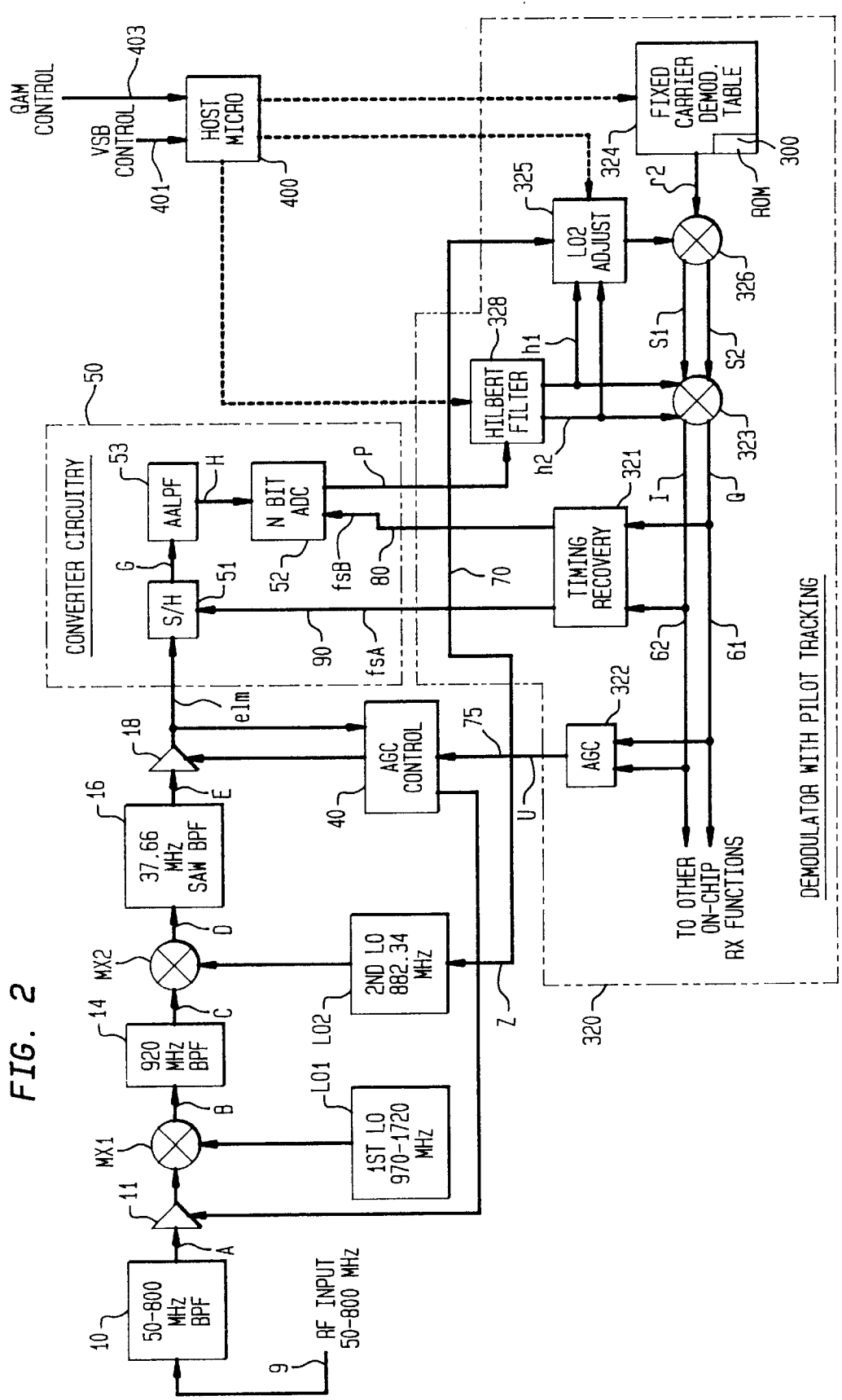
FIG. 2 is a block diagram of a portion of a HDTV receiver with sampling of the IF stage in accordance with the present invention.

FIG. 2 shows in block form a system embodying the invention. The input section of the receiver is similar to the prior art input section. That is, the RF input 9 comprising signals ranging from 50 to 800 MHz is applied to a band pass filter 10 whose output "A" is applied to the input of an amplifier stage 11 whose gain is controlled by means of an automatic gain control (AGC) circuit 40. The output of Amplifier 11 and the output of a first local oscillator, LO1, are applied to a first mixer, MX1. The output "B" of mixer MX1 is applied to the input of a 920 MHz bandpass filter 14. The section just described is identical to the prior art circuitry shown in FIG. 1.

Figure 3A:
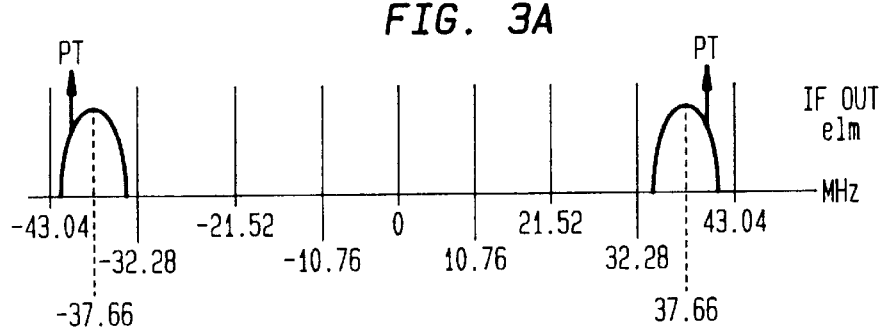
FIG. 3 is a diagram of waveshapes associated with the circuit of FIG. 2.

In FIG. 2, the output "C" of bandpass filter 14 and the output of a second local oscillator, LO2, are supplied to a second mixer, MX2, where they are mixed. The output "D" of mixer MX2 is supplied to the input of a bandpass filter 16. In FIG. 2, the center frequency of LO2 is 882.34 MHz and bandpass filter 16 is designed to have a center frequency of 37.66 MHz. The significance of the selection of the center frequency of 882.34 MHz for LO2 and the selection of the center frequency of bandpass filter 16 to be 37.66 MHz is discussed below. The output, E, of bandpass filter 16 is applied to an input of an IF amplifier 18, whose gain is controlled by one or more signals from AGC circuit 40. The output, e1m, of amplifier 18 is applied to the input of a converter circuit 50. The signals E and e1m lie within a frequency band centered about 37.66 MHz, as shown for the waveform in FIG. 3A identified as IF OUT.

Figure 3B:
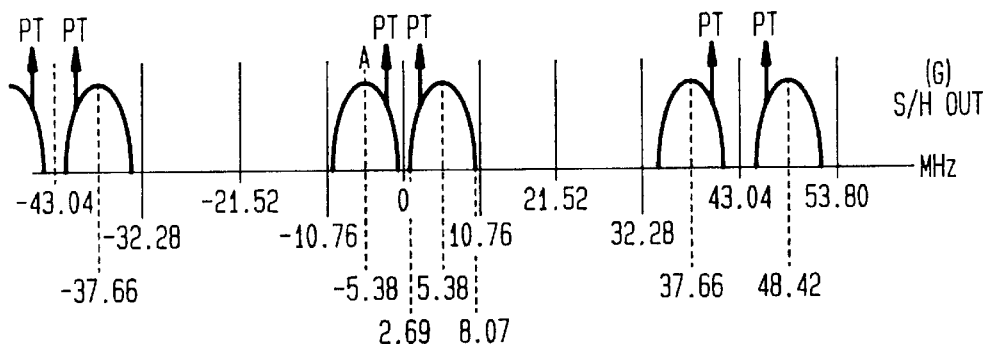

Referring back to FIG. 2, e1m is applied to the input of a sample and hold (S/H) circuit 51, operated at a sampling rate of 43.04 million samples per second (MSPS). Sample and hold circuit 51 may be, for example, a circuit such as the Analog Device AD 9101, or any similarly available or like circuit. The output G of S/H 51 has a spectrum as shown in FIG. 3B identified as S/H OUT. As shown in FIG. 3, the IF OUT band of signals centered at 37.66 MHz is translated down to a center frequency of 5.38 MHz with a mirror image with a center frequency of −5.38 MHz. The bandwidth of the signal extends ±2.69 MHz about the center frequency. Note that the S/H output also includes a band of signals having a center frequency of 37.66 MHz with a mirror image having a center frequency at 48.42 MHz. The S/H output also includes a band of signals having a center frequency of −37.66 MHz and −48.42 MHz, respectively. Note also that, as shown in FIG. 3B, there may be a pilot tone (PT) signal shown by a vertical arrow.

Figure 3C:
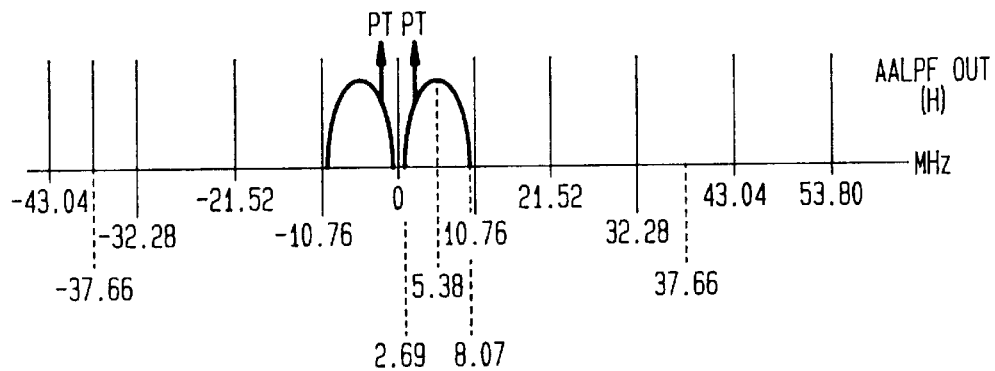
Figure 3D:
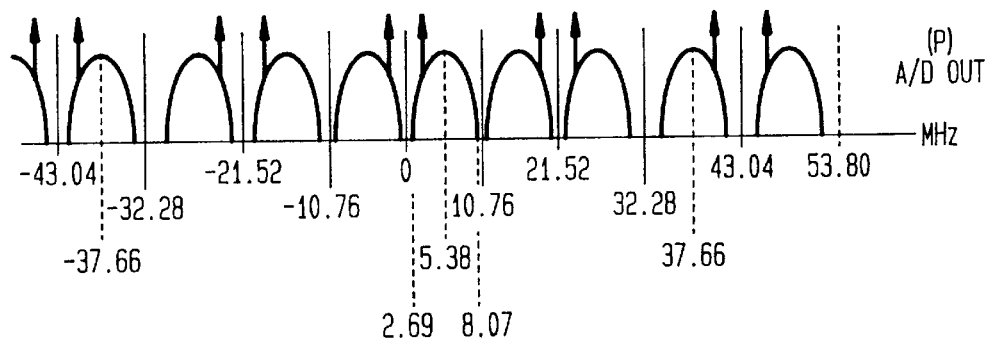

The output (G) of S/H 51 is applied to the input of an anti-aliasing low pass filter (AALPF) 53 to produce an output (H) which has a spectrum identified as AALPF OUT in FIG. 3C. The filter 53 eliminates all signals outside of the signals having a center frequency of 5.38 MHz and the mirror image having a center frequency of −5.38 MHz. The output (H) of filter 53 is applied to the input of an N-bit analog to digital converter (ADC) circuit 52 which is operated at a conversion or sampling rate of 21.52 MSPS. ADC 52 may be, for example, a 10-bit ADC such as the SPT 7855 made by Signal Processing Technologies or any similarly available or like designed circuit. The output (P) of A/D converter 52 has the frequency response shown in the waveform identified as A/D OUT in FIG. 3D. Since the periodic repetitions in A/D OUT do not overlap, the sampling process of the A/D converter has no aliasing.

S/H 51 is operated at a 43.04 MHz rate even though the signal bandwidth is only 6 MHz because S/H 51 must be rated for signals that have a frequency content lying in a range between 34–40 MHz. Thus, one cannot simply use an A/D converter which samples at twice the bandwidth of the 6 MHz signal band (12 MHz) when such a high center frequency (i.e., 37.66 MHZ) exists.

Thus while S/H 51 is sampled at a 43.04 MHz sampling rate, as stated above, a 43.04 MHz analog-to-digital conversion rate is not required. S/H 51 functions to translate the IF center frequency from 37.66 MHz to 5.38 MHz via the sampling process. As shown in the S/H OUT waveform of FIG. 3B, the bandwidth of the translated S/H output signal (G) will extend up to 8.07 MHZ and down to 2.69 MHz. Thus, an A/D sampling rate of 21.52 MHz (controlled by signals from circuit 321 supplied on lead 80) will satisfy the Nyquist criteria.

In the circuit of FIG. 2, two sampling rates are used; one sampling rate (43.04 MHz) is used for S/H 51 and another sampling rate (21.52 MHz) is used for A/D converter 52. Therefore, an anti-aliasing low pass filter (AALPF) 53, is inserted between the output of S/H 51 and the input to ADC 52. This insures that the A/D converter sampling process sees no energy beyond 10.76 MHz, to satisfy the Nyquist criteria of ADC 52. Thus, in FIG. 2, a 43.04 MHz sampling clock is supplied to S/H 51 via line 90 and a 21.52 MHz sampling clock is supplied to ADC 52 via line 80. In contrast, in the baseband scheme of FIG. 1, two (2) ADC converters (29 and 30) are required, with a sampling clock which could be as low as 10.76 MHz being supplied to both ADC 29 and 30 via line 85.

A comparison of FIGS. 1 and 2 reveals that the synchronous detector 20 of FIG. 1 has been effectively replaced by a sample and hold circuit 51 and that the system of FIG. 2 requires only one N bit A/D converter for either VSB or QAM.

The problems associated with the prior art system of FIG. 1 have been eliminated and there is, also, no need for an asymmetric equalizer.

Therefore, in systems embodying the invention, the complexity of the circuitry has been reduced and the performance has been improved, at the same time. However, it should be noted that the system of FIG. 2, requires that the demodulator 320 be different than the demodulator 32 used in FIG. 1. The differences may be noted by comparing the front end of the demodulator of FIG. 1 with that shown in FIG. 2. The demodulator 320 of FIG. 2 includes a Hilbert filter 328, a timing recovery circuit 321, an AGC circuit 322, a demodulator 323, an LO2 adjustment circuit 325, a summer 326 and a fixed carrier demodulation table 324. The Hilbert filter is needed to accurately produce the quadrature related signals I and Q produced for the QAM mode.

The N-bit output, P, from ADC 52 is applied to an input of Hilbert filter 328. Hilbert filters are known in the art and are discussed, for example, in "Digital Signal Processing", A. Oppenheim and R. Schafer, Ch. 7, Prentice Hall, 1975; and "Theory and Application of Digital Signal Processing", L. Rabiner and B. Gold, pp. 71–72, Prentice Hall, 1975.

The Hilbert filter 328 may be generated by standard design procedures. The output (P) of ADC 52 is applied to the input of Hilbert filter 328 which has two outputs (h1, h2), with the h1 output representing the real component of the filter output and the h2 output representing the quadrature component of the filter output with h2 output being used for QAM. For the VSB mode, h2 can be set to zero thereby removing any imaginary channel. The h1 and h2 outputs of the Hilbert filter may be used to adjust the frequency of the second local oscillator LO2. As shown in FIG. 2, h1 and h2 are applied to the input of an LO2 adjustment circuit 325 having an output Z which is supplied via line 70 to LO2. The application of the output Z signal functions to remove frequency offset within the selected channel in predetermined quantization steps of, for example, 60 KHz.

The Hilbert filters function generally as follows: One output (e.g., h1) is obtained by filtering through a linear phase symmetric impulse response while the other output (e.g., h2) is obtained by filtering through a linear phase anti-symmetric impulse response. In the present system, Hilbert filter 328 functions as a real input, complex output, digital filter intended for the QAM modulation to split the received signal into its real and imaginary components. For the VSB mode, the Hilbert filter will pass only the real component (h1) of the received signal since the modulation is one dimensional. For the VSB mode, the receiver is programmed to ignore the h2 imaginary component. This is achieved based on configuration data detailing a VSB system held in the host microprocessor 400. Although not detailed, it should be appreciated that, in response to a VSB control signal 401 applied to the host microprocessor 400 or to a QAM control signal 403 applied to microprocessor 400, the microprocessor 400 controls the proper operation of the function.

The LO2 adjustment circuit 325 also supplies a signal r1 to summer circuit 326. The signal r1 represents the correction necessary to remove the residual frequency offset after LO2 has been adjusted to within 60 Khz of the nominal transmitter frequency. The signal on lead r1 represents the supplemental angle to add to the fixed carrier angle to demodulate the output of the Hilbert filter completely to baseband. The fixed carrier angle is produced by fixed carrier demodulator table circuit 324 which produces an output signal r2 supplied to summer (adder) network 326. The adder network 326 functions to sum the r1 and r2 signals and produces output signals s1 and s2 which are the sine and cosine of the composite angles employed for demodulation; which demodulation is accomplished at the sampling rate.

The signal r1 may be generated via phase locked loop (PLL) circuitry located within LO2 adjust circuit 325. Normally, this circuitry cannot handle as much offset as is anticipated in LO2 (approximately 1 MHz). Thus, prior to operating this loop, the majority of the offset is removed via signal Z. The signal r2 will be generated via a table look-up scheme, detailed below.

The two outputs, s1, s2, from summer 326 are applied to demodulator 323 whose other inputs are the h1 and h2 outputs from Hilbert filter 328. For the VSB mode, only the h1 output is used; h2 is set to zero. Demodulator 323 produces at its output baseband signals I and Q which are coupled via lines 62 and 61, respectively, to timing recovery circuit 321 and AGC circuit 322.

The I and Q signals produced on lines 62 and 61, respectively, are the digital equivalent of the I and Q signals produced at the outputs of the ADC 29 and 30 in the prior art system of FIG. 1.

The I and Q signals produced in accordance with the invention have the following advantages:

1—I and Q have exactly 90 degrees phase difference at all frequencies for every implementation. This is in contrast to the prior art approach where there is approximately 90 degrees phase difference and there is no consistent phase difference between multiple receivers of the same design. This is due to the fact that, in accordance with the invention, the I and Q signals are derived via a digital Hilbert filter, whereas in the prior art, I and Q are derived via analog circuit means; and 2—I and Q have a precisely controlled amplitude characteristic as compared to FIG. 1 where component tolerances cause inconsistent amplitude variations between multiple implementations.

The timing recovery circuit 321 processes the received I and Q signals as inputs because the transmit signal for QAM was generated using the transmitted I and Q signals. After processing, the timing recovery circuit, 321, generates clock signals which are locked to the transmitter clock signals.

Timing recovery circuit 321 produces a 43.04 MHz sampling signal applied to S/H 51 via line 90 and a 21.52 MHz sampling signal applied to ADC 52 via line 80. The 43.04 MHz clock may be generated via a 43.04 MHz voltage controlled crystal oscillator with a control input generated internal to block 321. The 21.52 MHz clock signal may be generated by a simple divide by 2 circuit to which the 43.04 MHz clock is applied.

AGC 322 produces an output signal "U" which is coupled via line 75 to AGC control circuit 40. Signal U is a digital signal as compared to the analog control of the prior art. The digital signal, U, can be utilized by the AGC circuit 40 by a serial transfer of the bits representing the signal into, for instance, a multiplying D/A converter (MDAC) which is a standard component for digitally controlled AGC's.

In the system of FIG. 2, the Timing Recovery circuit 321 and the AGC 322 circuit are preceded by a digital demodulator 323 to baseband system which includes a fixed carrier demodulator look-up table circuit 324 [n(2π/8) for VSB and n(2π/4) for QAM] and an LO2 adjustment circuit 325 for correcting any frequency offset of LO2. For the VSB system, the LO2 adjustment scheme is a digital pilot tone tracking loop. The QAM system will also be required to adjust LO2 but may not include a pilot tone for that purpose. The QAM scheme may be completely data directed. The total angle which is the sum of the fixed carrier and any offset produced by the LO2 adjustment circuit is summed at summer 326. The design of the LO2 adjustment circuit for VSB could take a similar form to the analog loop shown in FIG. 1 through blocks 24, 25, 26 and 27 or could include variations. The QAM loop may be derived without the aid of a pilot tone.

Consider first, operation for the VSB system. Tracking the pilot tone (PT), indicated by a vertical pointing arrow in FIGS. 3A–3D, is accomplished digitally using a digital phase tracking loop located within LO2 adjust circuit 325 in the demodulator chip 320. The LO2 adjust circuit 325 outputs a coarse adjustment control (Z) which is applied via line 70 to LO2. That is, the digital phase pilot tone tracking loop attempts to remove frequency offset on the pilot within a certain frequency range (e.g., 60 KHz). If the offset proves to be greater than 60 KHz, the tracking loop can bring up LO2 via control line 70 in 60 KHz steps until the offset is within 60 KHz. The coarse and fine adjustments (fine adjustments are made by means of signals r1 and r2 supplied to demodulator 323) can be saved on a channel change circuitry (a RAM) in a memory circuit located at the demodulator chip host microprocessor 400 for subsequent use. This feature was not possible with the prior art analog phase tracking loop.

Consider next that the system is intended to demodulate digitally two different carriers. One carrier for a VSB system and the other carrier for a QAM system. It is desirable to select an Intermediate frequency (IF) which allows very simple digital demodulation for both schemes. Since, in this application, the QAM and VSB baud rates are related by a factor of 2 (5.38 MHz and 10.76 MHz, respectively), it is desirable to sample the A/D converter 52 at a 21.52 MHz sampling rate for either VSB or QAM. To satisfy the Nyquist criteria, prior to sampling there is inserted a 10.76 MHz anti-aliasing low pass filter (AALPF) 53. This means that the sample and hold circuit 51 must shift the spectrum from 37.66 MHz as shown in waveform S/H OUT of FIG. 3B.

The center frequency for the IF bandpass filter 16 was selected to be 37.66 MHz to enable the digital demodulation by the fixed carrier frequency to be done by very simple angles. The demodulation by the carrier possesses the form $e^{(-jw_cnTs)}$; where wc is equal to $2\pi fc$, and fc is the carrier frequency; n is an integer; and Ts is equal to 1/fs; where fs is the sampling rate or frequency at which the ADC 52 is sampled.

Note that the demodulation angle used to perform the final conversion of the sampled data to the baseboard signal is a function of $e^{(-jw_cnTs)}$ which is equal to: $\cos w_c nTs - j \sin w_c nTs$; where $w_c = 2\pi fc$ and Ts=1/fs. By selecting fs to be equal to Kfc where K is a rational number, the expression for the demodulation angle reduces to $e^{(-j2\pi n/K)}$.

For VSB, fc is 2.69 MHz and for QAM, fc is 5.38 MHz. For both systems, fs is 21.52 MHz. Therefore, the value of K for QAM is equal to 4 and K for VSB is equal to 8, whereby the demodulation angle for QAM is a function of $n(2\pi/4)$ and the demodulation angle for VSB is a function of $n(2\pi/8)$. For this illustrative example, the values of the demodulation angle for QAM and VSB can be calculated for different values of n as set forth below:

| For QAM: | | |
|---|---|---|
| n | $\cos(2\pi/4)(n)$ | $\sin(2\pi/4)(n)$ |
| 1 | 0 | 1 |
| 2 | -1 | 0 |
| 3 | 0 | -1 |
| 4 | 1 | 0 |

| For VSB: | | |
|---|---|---|
| n | $\cos(2\pi/8)(n)$ | $\sin(2\pi/8)(n)$ |
| 1 | $\cos 45 = \sqrt{2}/2$ | $\sqrt{2}/2$ |
| 2 | $90 = 0$ | 1 |
| 3 | $135 = -\sqrt{2}/2$ | $\sqrt{2}/2$ |
| 4 | $180 = 1$ | 0 |
| 5 | $225 = \sqrt{2}/2$ | $-\sqrt{2}/2$ |
| 6 | $270 = 0$ | 1 |
| 7 | $315 = -\sqrt{2}/2$ | $-\sqrt{2}/2$ |
| 8 | $360 = 1$ | 0 |

By the appropriate selection of the frequency relationship of fc to fs, demodulation angles are produced which are very easy to implement via table look up with-very small table sizes. The QAM case can merge the eight values of sine and cosine, shown above, to only 5 distinct values by adding a "1" to the fifth row of the sine table and noticing that cosine can be generated from the sine table by adding 2 to the sine pointer within the table. Thus, QAM requires a table of only 5 values for both sine or cosine, whose values will be either 0 or ±1. Similarly, the VSB case requires a table of 10 values for sine or cosine which will be either 0, ±1 or ±$\sqrt{2}/2$. These tables may be stored in a ROM 300 located within fixed carrier demodulator table 324 which is accessed depending on the mode (VSB or QAM) selected by the host microprocessor 400. Note that if a different IF frequency is selected (other than 37.66 MHz), the size of the required tables may change significantly.

The S/H sampling frequency (fSA) was selected to be 43.04 MHz so that the A/D (fSB) sampling clock could be derived from the S/H clock by a simple divide by 2 (21.52 MHz). It is advantageous to use 21.52 MHz as a sample clock because the desired symbol rates of the system are 10.76 MHz and 5.38 MHz for VSB and QAM, respectively. Not only will the symbol clock rate be easy to generate this way by dividing the 43.04 MHz clock by 4 or 8, but the resulting decimation by 2 is simple as well. That is, any symbol rate processing required by other receiver functions must decimate the sampling data stream by 2 or 4 for VSB or QAM, respectively. With the sampling and symbol rates selected, this means simply discard every other sample for VSB and 3 of every 4 samples for QAM for those processes that desire symbol rate input. If a different sampling rate was selected which was a rational ratio of the symbol rate [i.e., (n/m)(21.52)], then a more complex interpolation/decimation approach at the input to symbol rate processing is required. Selecting the sample/symbol ratio in accordance with this invention, obviates the need for complex interpolation/decimation approaches.

It should be appreciated that the invention may be used with any IF frequency by changing the S/H sampling rate. For example, assume that it is desired to use a standard 44 MHz IF filter instead of the 37.66 MHz filter 16. Then, the S/H must be operated at a sampling rate of 49.38 MHz (i.e., 5.38 MHz above the center frequency of IF filter 16. The result would give a similar spectrum at the S/H output as is shown in FIG. 3B. The AALPF output can then be sampled at the 21.52 MHz rate. However, there is now a disadvantage in that the 21.52 and 49.38 are not related by a simple ratio of two whole numbers such as 2:1 set for 43.04 and 21.52. The use of such a ratio would increase the complexity of the clock generating circuitry. Furthermore, a ratio such as this would increase the sampling clock jitter.

Consequently in systems embodying the invention it is preferred (although not necessary) to set the center frequency of IF filter 16 at 37.66 MHz. Such a filter is not standard. But, present day technology permits such a filter to be designed in a surface acoustical wave (SAW) filter.

Further, if for instance analog NTSC TV were to co-exist with the digital HDTV within the same TV set, it may not be desirable to sample the S/H at 43.04 MHz because of anticipated interference with the 44 MHz IF frequency currently used in the analog NTSC TV signal. If it is undesirable to change the analog NTSC IF frequency to coincide with the digital IF frequency of 37.66 MHz, a 75.334 MHz voltage controlled crystal oscillator could be incorporated which, when divided by 2, creates a S/H sampling rate of 37.66 MHz. This frequency (75.334 MHz) will no longer coincide with the analog NTSC IF frequency range. Also, instead of using a 37.66 MHz IF frequency for the digital HDTV, it must be changed to 32.39 MHz to obtain the resulting AALPF spectrum in FIG. 3C. Now, to generate the 21.52 MHz sampling clock requires a rational rate multiplier of 2/7 times the master crystal oscillator frequency (i.e., 75.334 MHz). This is more complex than a simple divide by 2 used for the 43.04 MHz sample and hold rate and may create higher clock jitter on the sample clock.

In the system of FIG. 2, the AGC control 40 is derived from a combination of analog IF circuitry and the digital AGC block 322 which follows the A/D converter 52. The IF circuitry supplements the AGC because of the problems that may arise if the A/D converter 52 were to saturate in the absence of the IF AGC control. The delay to reacquire AGC will be shorter using this approach as compared to a completely digital AGC approach.

Figure 4:
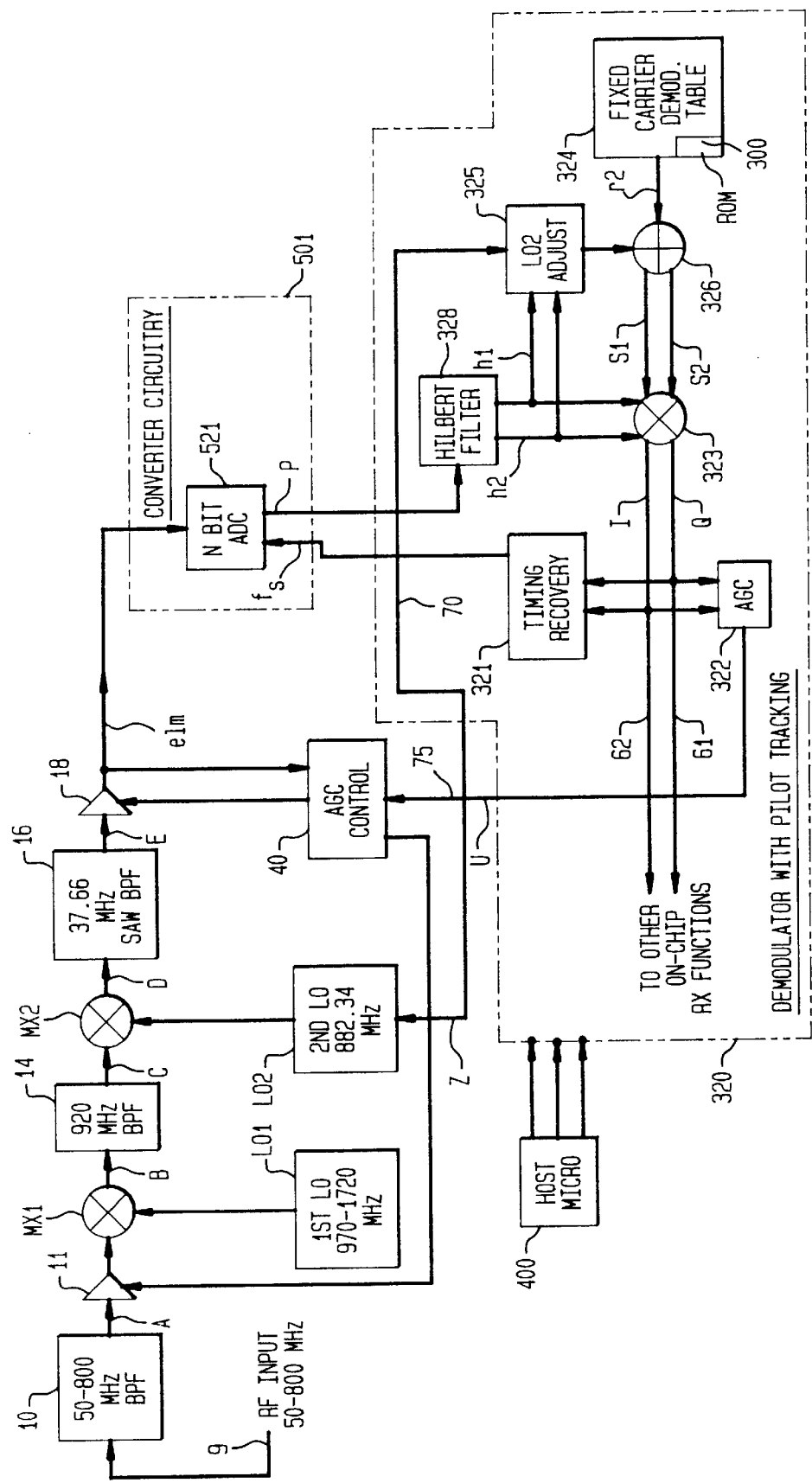
FIG. 4 is a block diagram of a portion of another HDTV receiver with sampling of the IF stage in accordance with the invention.

As shown in FIG. 4, systems embodying the invention may use an alternative approach to circuit 50. The alternative is to use a 43.04 MHz A/D converter with its own internal sample and hold circuitry and digital conversion operating at 43.04 MHz. For example, converter circuit 501 in FIG. 4 would replace converter circuit 50 in FIG. 2. In FIG. 4, an N-bit ADC 521 is connected at its input (H) to the output of amplifier 18 to receive the IF signal, e1M, and its N-bit output (P) is supplied to the input of a Hilbert filter 328. Note that this configuration does not require an AALPF or external S/H as did FIG. 2. It also does not require the AALPF 28, 31 in the configuration of FIG. 1. This is because FIG. 4 has only one sampling process, not two, as in FIG. 2. However, ADC 521 of FIG. 4 has to be capable of operating at twice the frequency of ADC 52 in FIG. 2. The timing recovery circuit 321 supplies a 43.04 MHz clocking sampling signal to ADC 521.

The e1M IF signal sampled by ADC 521 is the 6 MHz bandwidth IF OUT signal shown in FIG. 3 having a center frequency (fc) of 37.66 MHz extending +3 MHz up to 40.66 MHz and ranging down by 3 MHz to 34.66 MHz.

By sampling the IF signal at a rate of 43.04 MHz, a band of signals is produced extending between −8.07 MHz and −2.69 MHz with a center frequency of −5.38 MHz. Applicant recognized that the "negative" IF frequency component generates a mirror image lying between 2.69 MHz and 8.07 MHz with a center frequency of 5.38 MHz. Furthermore, other repetitions are formed by the 43.04 MHz sampling, as shown by waveform S/H OUT in FIG. 3B. Recall that in FIG. 2, since a first sampling takes place at 43.04 MHz and a second sampling takes place at a rate of 21.52 MHz, all analog energy must be removed beyond 10.76 MHz by means of AALPF 53. By contrast, in the FIG. 4 system, the only sampling done is at 43.04 MHz and since aliasing is not evident at the S/H OUT, no AALPF is required. Thus, for the configuration of FIG. 4, since there is only one sampling process, the spectrum labeled S/H OUT is actually the spectrum of the output of the A/D converter. Further, since there is no overlap around ½ the sampling frequency [½(43.04)=21.52 MHz], no aliasing is evident.

Applicant also recognized that ADC 521 need not be sampled at a rate of twice the highest frequency of 40.66 MHz to satisfy the Nyquist criteria and to produce a desired baseband signal of the type shown in waveform S/H OUT in FIG. 3B.

It is important to note that in systems and circuits embodying the invention, it is the IF signal which is sampled. Thus, only first and second local oscillators and only two mixers are needed to down convert the IF input signal to the intermediate frequency band which IF band is then sampled to demodulate the I,Q signals of interest. It is also important to note that the I and Q signals are produced by the same circuitry whereby the phase and amplitude of the I and Q signals are not affected by the values of different components along different paths.

What is claimed is:

1. A radio frequency (RF) receiver comprising:

an input terminal adapted to receive one or more of a number of different digitally modulated RF input signals;

a converting means having an input and an output;

means coupling the input of said converting means to said input terminal for down converting one of said RF input signals and producing at the output of said converting means an intermediate frequency (IF) signal;

a sampling means having an input coupled to the output of said converting means for digitally sampling the IF signal and having an output for producing thereat a baseband signal in response to one of said RF input signals; and said sample means further comprising a sample and hold circuit (S/H) having an input, an output and a clocking input; a low pass filter having an input and an output; an analog-to-digital converter (ADC) having an input, an output and a clocking input; means coupling the input of the S/H to the output of the converting means and the output of the S/H to the input of the low pass filter; means coupling the output of the low pass filter to the input of the ADC; and, means for applying a sampling signal having a frequency f3 to the clocking input of the S/H and for applying a sampling signal having a frequency f4 to the clocking input of the ADC, wherein f3 is a rational multiple of f4.

2. A radio frequency receiver as claimed in claim 1 wherein the frequency of f3 is two times the frequency of f4 (i.e., f3=2f4).

3. A radio frequency (rf) receiver comprising:

an input terminal adapted to receive one or more of a number of different digitally modulated rf input signals, including quadrature amplitude modulated (QAM) and vestigial side band (VSB) rf input signals;

a converting means having an input and an output, said converting means including a first mixer and a second mixer, each of said mixers having an input and an output, a first local oscillator (LO1) and a second local oscillator (LO2), each local oscillator having an output at which is produced a frequency signal, means coupling an output of LO1 and the rf input signals to the input of the first mixer, means coupling the output of the first mixer to an input of a first bandpass filter (BPF1) having a first center frequency (fc1) and a bandwidth of Bhz to produce at an output of BPF1 a first output signal (fo1) having a first center frequency of fc1 with a bandwidth of Bhz, means coupling the output of BPF1 and an output of LO2 to an input of the second mixer for down converting the rf signal, and, means coupling the output of the second mixer to an input of a second bandpass filter (BPF2), said BPF2 having a second center frequency (fc2) and a bandwidth of Bhz, and BPF2 having an output defining the output of said converting means for producing thereat an intermediate frequency (IF) signal whose center frequency is equal to fc2 and whose bandwidth is equal to Bhz; and a sampling means having an input coupled to the output of said converting means for digitally sampling the intermediate frequency signal and having an output for producing thereat base band signals in response to the rf input signals, said sampling means including a sample and hold circuit (S/H) having an input, an output and a clocking input, a low pass filter having an input and an output, an analog-to-digital converter (ADC) having an input, an output and a clocking input, means coupling the input of the S/H to the output of the converting means and the output of the S/H to the input of the low pass filter, means coupling the output of the low pass filter to the input of the ADC, and, means for applying a sampling signal having a frequency f3 to the clocking input of the S/H and for applying a sampling signal having a frequency f4 to the clocking input of the ADC, wherein f is a rational multiple of f4, and, wherein said sampling means is capable of producing at its output an in-phase (I) base band signal and a quadrature (Q) base band signal in response to a QAM rf input signal and an in-phase (I) baseband signal in response to a VSB rf input signal.

4. A radio frequency receiver as claimed in claim 3 wherein the frequency of f3 is two times the frequency of f4 (i.e., f3=2f4).

5. A radio frequency receiver as claimed in claim 3, wherein the center frequency of the first bandpass filter minus the frequency of the signal at the output of the second local oscillator coupled to the second mixer is equal to the center frequency of the second bandpass filter.

6. A radio frequency receiver as claimed in claim 5, wherein the frequency of the sampling signal applied to the S/H circuit is equal to, or greater than, the sum of the center frequency fc2 of BPF2 plus a frequency fA; where fA is equal to either one half of the bandwidth of the QAM signal or one half of the bandwidth of the VSB signal.

7. A radio frequency receiver as claimed in claim 6, wherein said sampling means further comprises a Hilbert filter having an input, a real output, and an imaginary output, said output of the ADC being coupled to said input of said Hilbert filter, said Hilbert filter for producing at the output of the Hilbert filter the real and imaginary components of the sampled signals.

8. A radio frequency receiver as claimed in claim 7, wherein said real and imaginary components of the sampled signals at the output of the Hilbert filter are used to produce said I and Q base band signals responsive to said QAM rf input signal and said I baseband signal responsive to said VSB rf input signal.

9. A radio frequency receiver as claimed in claim 8, wherein the demodulator includes means for digitally demodulating the carrier signals and completing the transfer of the received signal to baseband at the output of the demodulator.

10. A radio frequency receiver as claimed in claim 9, wherein the center frequency (fc2) of BPF2 is selected such that the sampling frequency (fs) applied to the S/H circuit is equal to, or greater than, the sum of fc2 plus a frequency fA; where fA is either one half the bandwidth of the QAM signal or one half the bandwidth of the VSB signal.

11. A radio frequency receiver as claimed in claim 7, wherein there is also included means for adjusting the frequency of the second local oscillator; said means for adjusting including a local oscillator adjust circuit having an input coupled to the output of the Hilbert filter and having an output coupled to the second local oscillator for adjusting its frequency.

12. A radio frequency receiver as claimed in claim 3, wherein the output of the ADC is coupled to a Hilbert filter for producing at a first output a first signal which represents the real portion of the signal and at a second output a second signal which represents the imaginary portion of the signal.

13. A radio frequency (RF) receiver adapted to receive digitally modulated signals including quadrature amplitude modulated (QAM) and vestigial side band (VSB) RF signals, comprising:
an input terminal adapted to receive a digitally modulated RF signal, said input terminal having an output which comprises said RF signal with a frequency band centered at a first center frequency;
a signal conditioning circuit electrically coupled to said input terminal, said signal conditioning circuit receiving said RF signal and producing a first intermediate frequency (IF) signal centered at a first intermediate center frequency;
a sample and hold circuit electrically coupled to said signal conditioning circuit, said sampling and hold circuit producing a second IF signal centered at a second intermediate center frequency;
a filter electrically coupled to said sample and hold circuit, said filter isolating said second IF signal;
an analog to digital (A/D) converter electrically coupled to said filter, said A/D converter producing a digitized IF signal from said second IF signal; and a demodulator circuit electrically coupled to said A/D converter, said demodulator circuit adapted to demodulate said digitized IF signal, producing a baseband signal.

14. The receiver of claim 13, further comprising:
a first sampling signal at a first frequency applied to a clocking input of said sample and hold circuit; and
a second sampling signal at a second frequency applied to a clocking input of said A/D converter, wherein said first frequency is a multiple of said second frequency.

15. The receiver of claim 13, wherein
said digital IF signal is centered at said second intermediate center frequency; and
said A/D converter samples said second IF signal at a predetermined sampling frequency, wherein said sampling frequency is a multiple of said second intermediate center frequency.

16. The receiver of claim 13, wherein said demodulation of said digital IF signal further comprises the conversion of said digital IF signal into a baseband signal using a demodulation angle which is a function of $e^{(-j\omega_c n T_s)}$ where $\omega_c = 2\pi f_c$, $T_s = 1/f_s$, n is an integer, $f_c$ is said second intermediate center frequency, and $f_s$ is the sampling frequency at which said A/D converter samples said second IF signal, wherein $f_s$ is equal to $Kf_c$, where K is a rational number, thereby reducing said demodulation to $$e^{(\frac{-j2\pi n}{K})}.$$

17. The receiver of claim 16, wherein said intermediate center frequency is approximately equal to 37.66 Megahertz.

18. The receiver of claim 17, wherein $f_c$ is approximately equal to 2.69 MHz. for VSB signals.

19. The receiver of claim 17, wherein $f_c$ is approximately equal to 5.38 MHz. for QAM signals.

20. The receiver of claim 17, wherein K=4 for QAM signals, said demodulation angle being a function of $$\frac{n\pi}{2}.$$

21. The receiver of claim 17, wherein K=8 for VSB signals, said demodulation angle being a function of $$\frac{n\pi}{4}.$$

22. A radio frequency (RF) receiver, comprising:
an input terminal adapted to receive a digitally modulated RF signal, said input terminal having an output which comprises said RF signal with a frequency band centered at an initial center frequency;
a signal conditioning circuit electrically coupled to said input terminal, said signal conditioning circuit receiving said RF signal and producing a first intermediate frequency (IF) signal centered at a first intermediate center frequency;
an analog to digital (A/D) converter electrically coupled to said signal conditioning circuit, said A/D converter receiving said first IF signal and producing a digitized IF signal centered at a second intermediate center frequency; and
a demodulator circuit electrically coupled to said A/D converter, said demodulator circuit adapted to demodulate said digitized IF signal by converting said digitized IF signal into a baseband signal using a demodulation angle which is a function of $e^{(-j\omega_c nT_s)}$ where $\omega_c=2\pi f_c$, $T_s=1/f_s$, n is an integer, $f_c$ is said second intermediate center frequency, and $f_s$ is the sampling frequency at which said A/D converter samples said second IF signal, wherein $f_s$ is equal to $Kf_c$, where K is a rational number, thereby reducing said demodulation angle to $$e^{(\frac{-j2\pi n}{K})}.$$

23. The receiver of claim 22, wherein said first intermediate center frequency is approximately equal to 37.66 Megahertz.

24. The receiver of claim 23, wherein $f_c$ is approximately equal to 2.69 MHz. for VSB signals.

25. The receiver of claim 23, wherein $f_c$ is approximately equal to 5.38 MHz for QAM signals.

26. The receiver of claim 23, wherein K=4 for QAM signals, said demodulation angle being a function of $$\frac{n\pi}{2}.$$

27. The receiver of claim 23, wherein K=8 for VSB signals, said demodulation angle being a function of $$\frac{n\pi}{4}.$$

28. A down converting circuit for the conversion of an intermediate radio frequency (RF) signal converted from a RF signal input to a second intermediate frequency (IF) signal which is located at a substantially lower center frequency than said intermediate radio frequency, said second intermediate frequency (IF) signal being processed thereafter by a demodulating circuit in a RF receiver, comprising:

a sample and hold circuit with a signal input, a signal output and a clocking input, wherein said intermediate RF signal input is applied to said signal input;

an anti-aliasing low pass filter (AALPF) having an input coupled to the output of said sample and hold circuit and having an output;

an analog to digital (A/D) converter having a signal input coupled to the output of said AALPF, a signal output coupled to said demodulating circuit, and a clocking input; and a first sampling signal with a frequency $f_1$ applied to the clocking input of said sample and hold circuit, and, a second sampling signal with a frequency $f_2$ applied to the clocking input of said A/D converter, where $f_1$ is a multiple of $f_2$.

* * * * *

UNITED STATES PATENT AND TRADEMARK OFFICE
CERTIFICATE OF CORRECTION

| | |
|---|---|
| PATENT NO. | : 5,841,814 |
| APPLICATION NO. | : 08/544244 |
| DATED | : November 24, 1998 |
| INVENTOR(S) | : Robert L. Cupo |

It is certified that error appears in the above-identified patent and that said Letters Patent is hereby corrected as shown below:

In Col. 10, line 57,
replace "f" with --f3--.

In Col. 12, line 22,
replace " $e^{(-j\omega_c nT_s)}$ ," with -- $e^{(-j\omega_c nT_s)}$ --.

In Col. 12, line 60,
replace "(AID)" with --(A/D)--.

In Col. 13, line 2,
replace " $e^{(-j\omega_c nT_s)}$ " with -- $e^{(-j\omega_c nT_s)}$ --.

In Col. 7, line 10,
replace "baseboard" with -- baseband--.

In Col. 13, line 5,
replace "second" with --first--.

Signed and Sealed this
Fifteenth Day of February, 2011

David J. Kappos
*Director of the United States Patent and Trademark Office*